UNITED STATES PATENT OFFICE.

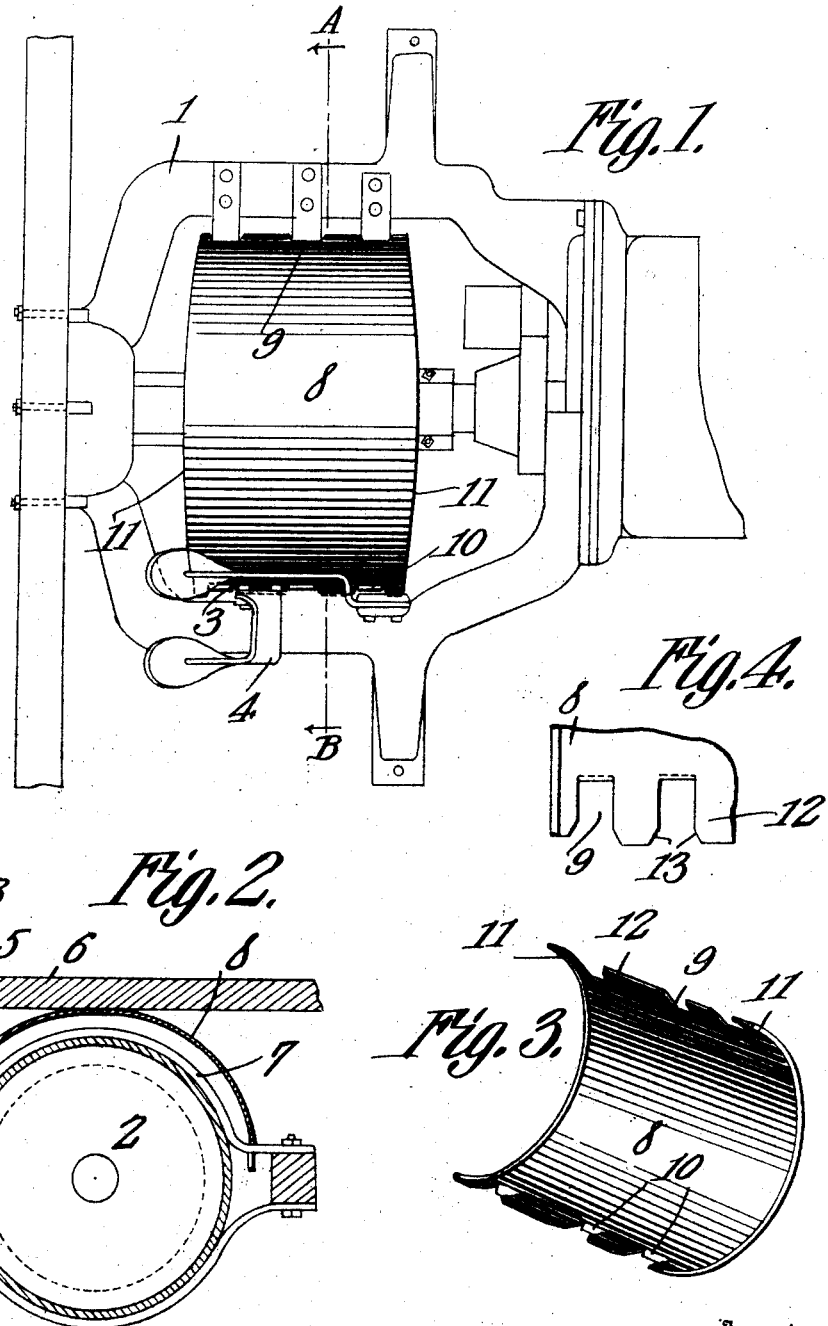

HENRY V. YOUNG, OF NEW CUMBERLAND, WEST VIRGINIA.

COVER FOR AUTOMOBILE TRANSMISSION-GEARS.

No. 926,800.            Specification of Letters Patent.            Patented July 6, 1909.

Application filed August 31, 1908. Serial No. 451,021.

*To all whom it may concern:*

Be it known that I, HENRY V. YOUNG, a citizen of the United States, residing at New Cumberland, in the county of Hancock and State of West Virginia, have invented a new and useful Cover for Automobile Transmission-Gear, of which the following is a specification.

This invention has reference to improvements in covers for automobile transmission gear and its object is to provide means for preventing the throwing of lubricants from the transmission gear in such manner as to soil the underside of the floor of the vehicle or the adjacent portions of the machine, or to reach the projecting portions of the foot levers where engaged by the foot of the operator, or to become lodged in the slots in the floor through which slots the foot levers project.

The soiling of parts of the machine adjacent to the transmission gear by throwing off of lubricating oil therefrom or the graphite mixtures usually employed is effectually prevented by the cover forming the subject matter of the invention, and this cover is not only easily applied and removed without tools, but is so constructed as to be effectually locked when in position against rattling caused by the jarring of the automobile in passing over rough roads.

The invention will be best understood from a consideration of the following detailed description taken in connection with the accompanying drawings forming a part of this specification in which drawing—

Figure 1 is a top plan view of a transmission gear and adjacent parts with the cover applied. Fig. 2 is a section on the line A—B of Fig. 1 showing also a portion of the floor of the vehicle body. Fig. 3, is a perspective view of the shield removed from the machine and Fig. 4 is a detailed view of a portion of the shield.

Referring to the drawings there is shown a frame 1 supporting the transmission gear indicated illustratively at 2 in Fig. 2 and this transmission gear is of a known type being characteristic of the automobile known commercially as the "Ford" automobile. The transmission gear therefore needs no description. It is to be observed however, that the transmission gear is provided with two foot levers 3, 4 projecting upwardly through slots 5 in the floor 6 of the body of the automobile. In the particular type of the transmission gear illustrated in the drawing, the parts of the gear are put into and out of action by means of the levers acting upon clutch bands, indicated at 7. Since the transmission gear and the bands for putting the same into and out of action form no part of the present invention no attempt has been made in the drawing to show any details of structure of these parts, but only a sufficient showing for understanding the invention.

In order to prevent throwing the oil or other lubricant used in connection with the transmission gear onto the surrounding parts when the automobile is in operation, there is provided a cover 8 made of a single piece of sheet metal, preferably copper, although not necessarily so, and this cover is so curved that when its ends are resting in engagement with the friction bands of the transmission gear the middle portion or crown of the cover is in yielding engagement with the under side of the floor 6 of the body of the automobile. The cover is wider at the central portion than at the ends and the said ends are each recessed or notched as indicated at 9, the notches being of sufficient width to permit the corresponding ends of the cover to straddle the clutch bands so that the cover is thus effectually locked from side movement.

At that end of the cover 8 where the clutch bands are liable to movement because of the operation of the levers the end walls of the slots are formed with lips 10 so as to form a broad bearing surface at the said ends thereof and thereby prevent marring or wear of the bands or of the cover. In order to strengthen the sides of the cover and provide a finish, the sides of the cover are provided with beads 11 which may be formed by turning the material of the cover about a wire housed in the corresponding edges of the cover.

When the cover is in place the bases or end walls of the recesses 9 rest upon the clutch bands while the crown of the cover is against the under side of the bottom 6 of the vehicle cover. The elasticity of the cover and its bearing both at the ends and at the crown effectually hold the cover in engagement with its support and thereby prevent rattling or other noises caused by the displacement of the metal parts one upon the other.

By making the cover of copper it will readily absorb any heat generated by the transmission gear when new and dissipate any such heat.

Any oil or other lubricant thrown off by the transmission gear when in operation will either be thrown toward the ground upward or toward the under surface of the cover to ultimately gravitate to the end of the same and drop off the extensions 12 between the recesses 9, which extensions may have their ends reduced in diameter by being narrowed at the outer ends indicated at 13, so as to direct any lubricant away from the clutch bands as it gravitates to the end of the cover and these narrowed ends of the extensions 12 will facilitate the dropping off of the lubricant toward the ground. The surrounding parts adjacent to the transmission gear are thus protected from being fouled or soiled by lubricant thrown off by the transmission gear, which lubricant without the shield 8 frequently finds its way through the slots 5 and upon the foot levers to the great annoyance of the operator.

When it is desired to remove the shield from the transmission gear it is only necessary to lift one end and thereby unfasten that end of the shield, when the entire shield may be readily pulled out from above the transmission gear, and the shield may be as readily reinserted without in either case the need of any tools whatsoever.

What is claimed is:—

1. A shield for the transmission gear of automobiles consisting of an elastic sheet of suitable material having spaced extensions at the ends conforming generally to the direction of the length of the sheet and adapted to straddle the clutch bands of the transmission gear, said sheet being shaped at one end, between the extensions, to present a broad bearing against the clutch bands.

2. A shield for the transmission gear of automobiles consisting of a curved, elastic sheet of suitable material having spaced extensions at the ends conforming generally to the direction of the length of the sheet and adapted to straddle the clutch bands of the transmission gear, with the body of the shield resting on the bands and the crown of the shield engaging the under side of the body of the automobile when the shield is in position on the transmission gear.

3. A shield for the transmission gear of automobiles consisting of a curved sheet of suitable metal, wider at the center than at the ends and having the ends recessed to form spaced extensions adapted to straddle the clutch bands of the transmission gear, the metal at the bases of the recesses at one end of the shield being formed into tongues projecting at approximately right angles to the spaced extensions.

4. A shield for the transmission gear of automobiles consisting of a curved sheet of metal wider at the center than at the ends and having its sides formed with strengthening means, the ends of the shield being recessed to form spaced extensions with their ends narrowed and the metal at the bases of the recesses at one end of the shield being formed into tongues projecting at approximately right angles to the spaced extensions.

In testimony that I claim the foregoing as my own, I have hereto affixed my signature in the presence of two witnesses

HENRY V. YOUNG

Witnesses:
C. S. WILSON,
A. H. McCONKEY.